US011517981B2

(12) United States Patent
Lin et al.

(10) Patent No.: US 11,517,981 B2
(45) Date of Patent: Dec. 6, 2022

(54) LASER POWDER DEPOSITION WELD REWORK FOR GAS TURBINE ENGINE NON-FUSION WELDABLE NICKEL CASTINGS

(71) Applicant: United Technologies Corporation, Farmington, CT (US)

(72) Inventors: Wangen Lin, S. Glastonbury, CT (US); Gary J. Larson, Madison, CT (US); Giovanni Whitman, Berlin, CT (US); Scott Poeppel, New Hartford, CT (US); Joseph Wilson, Granby, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 733 days.

(21) Appl. No.: 16/385,539

(22) Filed: Apr. 16, 2019

(65) Prior Publication Data

US 2019/0240784 A1 Aug. 8, 2019

Related U.S. Application Data

(63) Continuation of application No. 15/026,459, filed as application No. PCT/US2014/062183 on Oct. 24, 2014, now Pat. No. 10,265,802.

(Continued)

(51) Int. Cl.
*B23K 26/342* (2014.01)
*F01D 5/00* (2006.01)
(Continued)

(52) U.S. Cl.
CPC ............ *B23K 26/342* (2015.10); *B22F 5/009* (2013.01); *B22F 7/062* (2013.01); *B23K 26/144* (2015.10);
(Continued)

(58) Field of Classification Search
None
See application file for complete search history.

(56) References Cited

U.S. PATENT DOCUMENTS 3,590,318 A * 6/1971 Probst .................... B05B 1/048
361/227
5,071,054 A 12/1991 Dzugan
(Continued)

FOREIGN PATENT DOCUMENTS

| JP | 2001287062 | 10/2001 |
|---|---|---|
| JP | 2011136344 | 7/2011 |
| JP | 2012020308 A | 2/2012 |

OTHER PUBLICATIONS

EP search report for EP20176789.4 dated Oct. 19, 2020.

*Primary Examiner* — Geoffrey S Evans
(74) *Attorney, Agent, or Firm* — Getz Balich LLC (57) ABSTRACT

A method of reworking an aerospace component includes removing a casting defect from a component manufactured of a non-fusion weldable base alloy to form a cavity. The cavity is then at least partially filled with a multiple of layers of discrete laser powder deposition spots of a filler alloy. A cast component for a gas turbine engine includes a cast component non-fusion weldable base alloy with a cavity filled with a multiple of layers of laser powder deposition spots of a filler alloy. The filler alloy may be different than the non-fusion weldable base alloy. A layer of non-fusion weldable base alloy is at least partially within the cavity and over the filler alloy.

17 Claims, 7 Drawing Sheets

Related U.S. Application Data (60) Provisional application No. 61/897,623, filed on Oct. 30, 2013.

(51) Int. Cl.
| | |
|---|---|
| *F01D 9/04* | (2006.01) |
| *B23P 6/00* | (2006.01) |
| *B23K 26/32* | (2014.01) |
| *B22F 5/00* | (2006.01) |
| *B22F 7/06* | (2006.01) |
| *B23K 26/144* | (2014.01) |
| *F01D 25/24* | (2006.01) |
| *B23K 101/00* | (2006.01) |
| *C21D 9/50* | (2006.01) |
| *B23K 103/08* | (2006.01) |
| *C22C 19/05* | (2006.01) |

(52) U.S. Cl.
CPC ............. *B23K 26/32* (2013.01); *B23P 6/007* (2013.01); *F01D 5/005* (2013.01); *F01D 9/041* (2013.01); *F01D 25/24* (2013.01); *B22F 2007/068* (2013.01); *B22F 2999/00* (2013.01); *B23K 2101/001* (2018.08); *B23K 2103/08* (2018.08); *C21D 9/50* (2013.01); *C22C 19/057* (2013.01); *F05D 2220/32* (2013.01); *F05D 2230/10* (2013.01); *F05D 2230/21* (2013.01); *F05D 2230/31* (2013.01); *F05D 2230/80* (2013.01); *F05D 2300/17* (2013.01); *F05D 2300/175* (2013.01); *F05D 2300/177* (2013.01)

(56) References Cited

U.S. PATENT DOCUMENTS

| | | |
|---|---|---|
| 5,284,290 A | 2/1994 | Moore et al. |
| 5,405,272 A | 4/1995 | Rapoza |
| 5,603,603 A * | 2/1997 | Benoit .................... F01D 11/12 415/173.4 |
| 6,000,601 A | 12/1999 | Walak |
| 6,024,792 A * | 2/2000 | Kurz ...................... B23K 26/34 117/9 |
| 6,046,426 A | 4/2000 | Jeantette et al. |
| 6,110,199 A | 8/2000 | Walak |
| 6,143,378 A | 11/2000 | Harwell et al. |
| 6,296,447 B1 | 10/2001 | Rigney |
| 6,379,392 B1 | 4/2002 | Walak |
| 6,429,402 B1 | 8/2002 | Dixon et al. |
| 6,463,349 B2 | 10/2002 | White et al. |
| 6,483,069 B2 | 11/2002 | Coleman et al. |
| 6,554,920 B1 | 4/2003 | Jackson et al. |
| 6,609,894 B2 | 8/2003 | Jackson et al. |
| 6,615,470 B2 | 9/2003 | Corderman |
| 6,696,176 B2 | 2/2004 | Allen et al. |
| 6,709,766 B2 | 3/2004 | Coleman et al. |
| 6,799,626 B2 | 10/2004 | Ray et al. |
| 6,872,912 B1 | 3/2005 | Wos et al. |
| 7,278,315 B1 | 10/2007 | Klein et al. |
| 7,874,472 B2 | 1/2011 | Lee et al. |
| 8,413,877 B2 | 4/2013 | Bischof et al. |
| 8,442,665 B2 | 5/2013 | Krause |
| 10,328,526 B2 * | 6/2019 | Ols .......................... F01D 9/041 |
| 2002/0141868 A1 | 10/2002 | Lee |
| 2002/0170890 A1 | 11/2002 | Keicher et al. |
| 2003/0074096 A1 * | 4/2003 | Das ........................ B29C 64/153 700/119 |
| 2003/0075587 A1 * | 4/2003 | Smashey ................. B23P 6/007 228/119 |
| 2004/0118309 A1 * | 6/2004 | Fedor ..................... B29C 41/46 101/480 |
| 2005/0067466 A1 | 3/2005 | Boegli |
| 2005/0109818 A1 * | 5/2005 | Shimohata ........... B23K 26/342 228/119 |
| 2006/0163323 A1 | 7/2006 | Pietruska |
| 2006/0218788 A1 | 10/2006 | Boulnois |
| 2006/0225641 A1 | 10/2006 | Bostanjoglo |
| 2007/0077143 A1 * | 4/2007 | Sherlock .................. F01D 5/20 416/92 |
| 2007/0084047 A1 * | 4/2007 | Lange ..................... B23P 6/005 29/889.1 |
| 2008/0017280 A1 | 1/2008 | Vargas et al. |
| 2008/0017694 A1 | 1/2008 | Schnell |
| 2008/0028605 A1 | 2/2008 | Lutz et al. |
| 2008/0230156 A1 | 9/2008 | Abriles et al. |
| 2009/0056096 A1 | 3/2009 | Hixson |
| 2009/0057275 A1 | 3/2009 | Chen et al. |
| 2009/0297701 A1 | 12/2009 | Jabado |
| 2010/0200189 A1 | 8/2010 | Qi |
| 2011/0226390 A1 * | 9/2011 | Chen ................... B23K 35/0261 148/527 |
| 2012/0103950 A1 | 5/2012 | Arjakine |
| 2012/0251840 A1 * | 10/2012 | Maly ..................... C22C 19/056 428/680 |
| 2012/0267347 A1 * | 10/2012 | Arjakine ................ B23P 6/007 219/121.64 |
| 2013/0108460 A1 * | 5/2013 | Szwedowicz ............. C22F 1/10 164/48 |
| 2013/0232749 A1 | 9/2013 | Bruck |
| 2014/0017415 A1 | 1/2014 | Lin |
| 2014/0163717 A1 * | 6/2014 | Das ........................ G01J 5/004 700/119 |
| 2014/0259668 A1 | 9/2014 | Henderson |
| 2015/0184514 A1 | 7/2015 | Schmitt |
| 2016/0045982 A1 | 2/2016 | Stoodt |
| 2016/0175929 A1 * | 6/2016 | Colin ..................... B22F 10/25 419/23 |

\* cited by examiner

LASER POWDER DEPOSITION WELD REWORK FOR GAS TURBINE ENGINE NON-FUSION WELDABLE NICKEL CASTINGS

CROSS-REFERENCE TO RELATED APPLICATION

This application is a continuation application of U.S. patent application Ser. No. 15/026,459 filed Mar. 31, 2016, which is a national stage application of PCT Patent Application No. PCT/US2014/062183 filed Oct. 24, 2014, which claims priority to U.S. Provisional Patent Application No. 61/897,623 filed Oct. 30, 2013, which are hereby incorporated herein by reference in their entireties.

BACKGROUND

The present disclosure relates to a weld rework method and, more particularly, to a weld rework of a gas turbine engine component.

A gas turbine engine utilizes various relatively large, complex components cast from high temperature Nickel alloy. An example of such a component is the Mid Turbine Frame (MTF). The MTF includes a plurality of hollow vanes arranged in a ring-vane-ring structure in which the rings define inner and outer boundaries of a core combustion gas path while the vanes are disposed across the gas path. Tie rods often extend through the hollow vanes to interconnect an engine mount ring and a bearing compartment.

Casting components such as the MTF hollow vanes commonly result in flaws that are rework welded as part of the normal manufacture process. Various methods of rework with a filler alloy equivalent to that of the parent component non-fusion weldable base alloy, although effective, are relatively slow and expensive. In one rework example, a half-inch (13 mm) sized defect requires upward of ten hours to rework. Alternate methods of rework welding utilize an alternate filler alloy which is more weldable to facilitate a relatively quicker weld rework, but such an approach may face the cracking issue at the substrate alloy. The filler alloy may not be fully compatible with the material properties of the substrate alloy such as oxidation resistance or not be compatible with coatings and may shorten component service life.

SUMMARY

A method of reworking a component, according to one disclosed non-limiting embodiment of the present disclosure, includes removing a casting defect from a component manufactured of a non-fusion weldable base alloy to form a cavity; and at least partially filling the cavity with a multiple of layers of a multiple of laser powder deposition spots. Each of the multiple of laser powder deposition spots is formed of a filler alloy.

In a further embodiment of the present disclosure, the filler alloy is a fusion weldable powder material.

In a further embodiment of any of the foregoing embodiments of the present disclosure, the non-fusion weldable base alloy is a high gamma prime nickel based alloy.

In a further embodiment of any of the foregoing embodiments of the present disclosure, the non-fusion weldable base alloy is a polycrystalline cast nickel base superalloy.

In a further embodiment of any of the foregoing embodiments of the present disclosure, the filler alloy is PWA 795 and the non-fusion weldable base alloy is MAR-M 247.

In a further embodiment of any of the foregoing embodiments of the present disclosure, the method includes applying a non-fusion weldable base alloy cap at least partially within the cavity and over the filler alloy.

In a further embodiment of any of the foregoing embodiments of the present disclosure, the method includes electro-spark depositing the non-fusion weldable base alloy cap.

In a further embodiment of any of the foregoing embodiments of the present disclosure, the method includes applying a coating over the non-fusion weldable base alloy cap.

In a further embodiment of any of the foregoing embodiments of the present disclosure, the non-fusion weldable base alloy cap is about 0.010 inches (0.25 mm) thick.

In a further embodiment of any of the foregoing embodiments of the present disclosure, the method includes casting the component of the non-fusion weldable base alloy.

In a further embodiment of any of the foregoing embodiments of the present disclosure, the method includes casting the component to form a portion of a mid-turbine frame.

In a further embodiment of any of the foregoing embodiments of the present disclosure, the method includes wherein removing the casting defect results in a through hole; and sealing the through hole with a backing prior to at least partially filling the cavity.

A cast component for a gas turbine engine, according to another disclosed non-limiting embodiment of the present disclosure, includes a cast component manufactured of non-fusion weldable base alloy with a cavity at least partially filled with a multiple of layers of a multiple of laser powder deposition spots. Each of the multiple of laser powder deposition spots formed of a filler alloy. The filler alloy is different than the non-fusion weldable base alloy. A non-fusion weldable base alloy cap is included at least partially within the cavity and over the filler alloy.

In a further embodiment of any of the foregoing embodiments of the present disclosure, the non-fusion weldable base alloy is a high gamma prime nickel based alloy.

In a further embodiment of any of the foregoing embodiments of the present disclosure, the non-fusion weldable base alloy is a polycrystalline cast nickel base superalloy.

In a further embodiment of any of the foregoing embodiments of the present disclosure, the non-fusion weldable base alloy is MAR-M 247.

In a further embodiment of any of the foregoing embodiments of the present disclosure, the filler alloy is PWA 795 and the non-fusion weldable base alloy is MAR-M 247.

In a further embodiment of any of the foregoing embodiments of the present disclosure, a coating is included over the non-fusion weldable base alloy cap.

In a further embodiment of any of the foregoing embodiments of the present disclosure, the non-fusion weldable base alloy cap is about 0.010 inches (0.25 mm) thick.

In a further embodiment of any of the foregoing embodiments of the present disclosure, the cast component as a portion of a mid-turbine frame.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
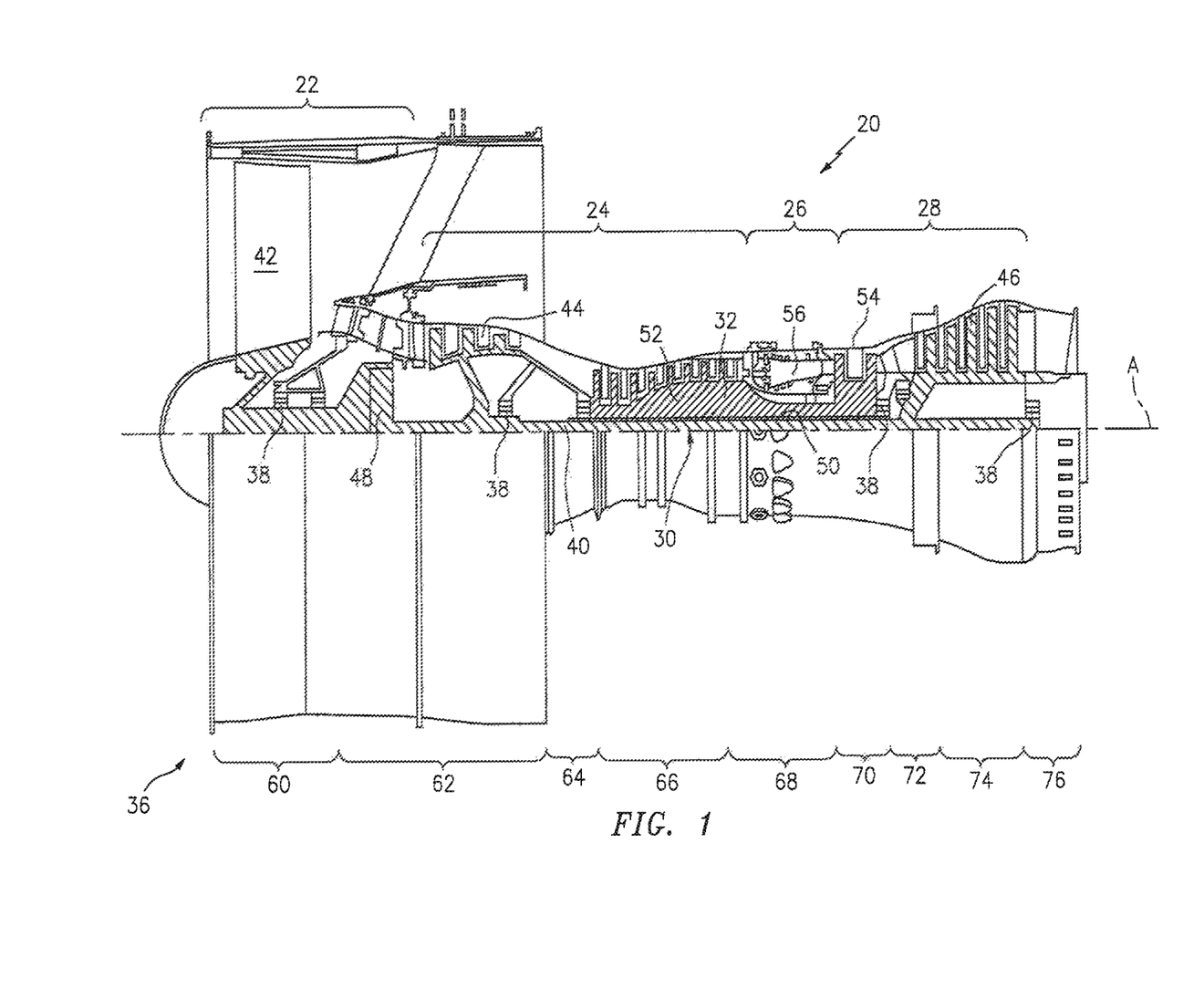
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, three-spool (plus fan) turbofans with an intermediate spool as well as industrial gas turbines.

The engine 20 generally includes a low spool 30 and a high spool 32 mounted for rotation about an engine central longitudinal axis A relative to an engine case assembly 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 (see FIG. 1) to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by the bearing structures 38 within the engine case assembly 36.

The engine case assembly 36 generally includes a plurality of modules, including a fan case module 60, an intermediate case module 62, a Low Pressure Compressor (LPC) module 64, a High Pressure Compressor (HPC) module 66, a diffuser module 68, a High Pressure Turbine (HPT) module 70, a mid-turbine frame (MTF) module 72, a Low Pressure Turbine (LPT) module 74, and a Turbine Exhaust Case (TEC) module 76. It should be understood that additional or alternative modules might be utilized to form the engine case assembly 36.

Figure 2:
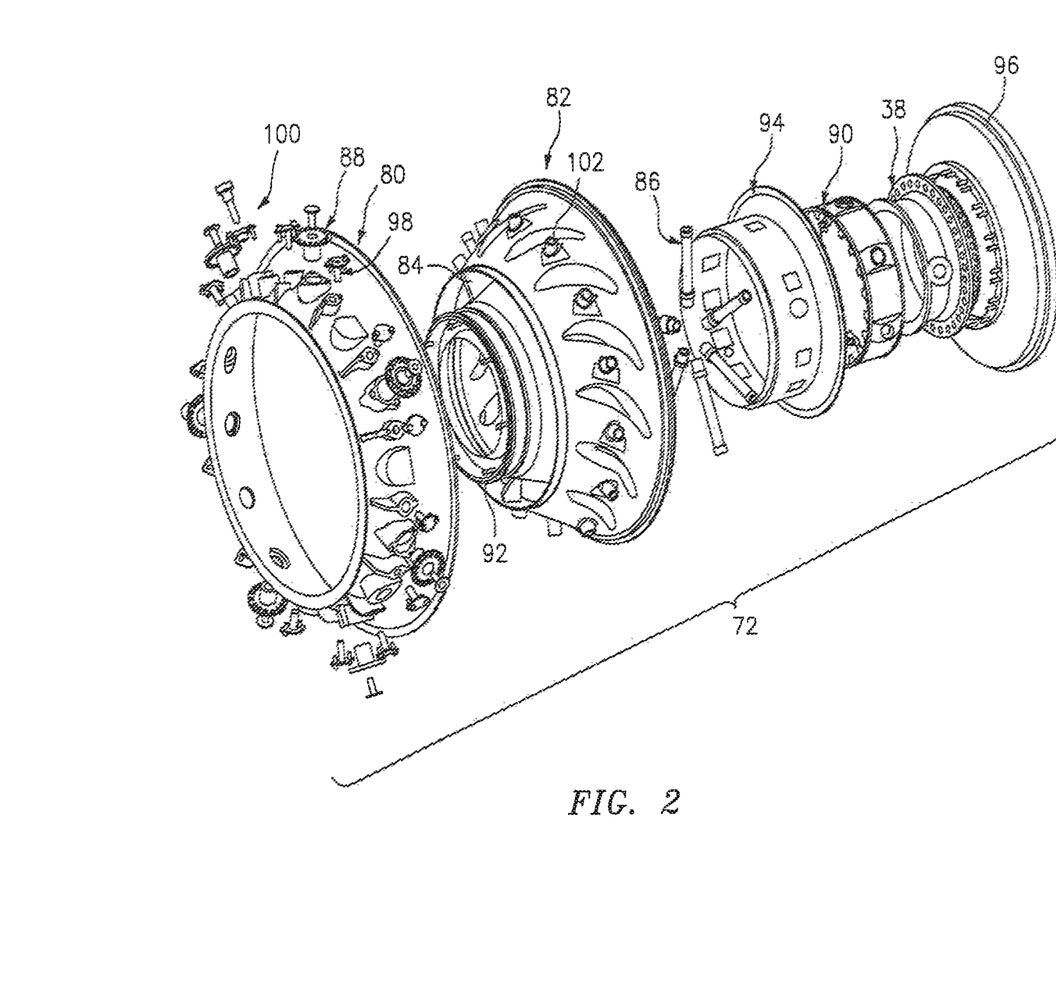
FIG. 2 is an exploded view of a Mid-Turbine Frame module.

With reference to FIG. 2, the MTF module 72 generally includes an outer turbine case 80, a mid-turbine frame (MTF) 82 which defines a plurality of hollow vanes 84, a plurality of tie rods 86, a multiple of tie rod nuts 88, an inner case 90, a HPT seal 92, a heat shield 94, a LPT seal 96, a multiple of centering pins 98 and a borescope plug assembly 100. The MTF module 72 supports a compartment 38 through which the inner and the outer shafts 40 and 50 are rotationally supported. It should be appreciated that various other components may additionally or alternatively be provided within the MTF 82, for example only, the LPT seal 96 may alternatively be referred to as an intermediate seal in other engine architectures.

Each of the tie rods 86 are mounted to the inner case 90 and extend through a respective vanes 84 to be fastened to the outer turbine case 80 with the multiple of tie rod nuts 88. That is, each tie rod 86 is typically sheathed by a vane 84 through which the tie rod 86 passes. The other vanes 84 may alternatively or additionally provide other service paths. The multiple of centering pins 98 are circumferentially distributed between the vanes 84 to engage bosses 102 on the MTF 82 to locate the MTF 82 with respect to the inner case 90 and the outer turbine case 80. It should be understood that various attachment arrangements may alternatively or additionally be utilized.

Figure 3:
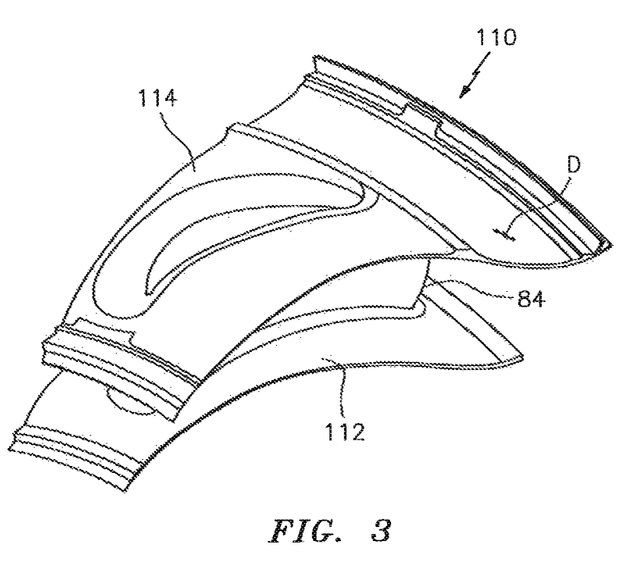
FIG. 3 is a perspective view of a Mid-Turbine Frame vane singlet as an example workpiece that has a casting defect.

With reference to FIG. 3, the MTF 82 in one disclosed non-limiting embodiment is manufactured of a multiple of cast singlets 110 (one shown). The multiple of singlets 110 are brazed together to define a ring-vane-ring configuration in which an inner platform 112 is spaced from an outer platform 114 by the multiple of vanes 84. Alternatively, the MTF 82 may be cast as a unitary component. The MTF 82 in this example is manufactured of a high gamma prime nickel based alloy such as MAR-M 247 polycrystalline cast nickel base superalloy. It should be appreciated that the MAR-M 247 polycrystalline cast nickel base superalloy is utilized in this example as the non-fusion weldable base alloy with the MTF 82 as the workpiece; however, other non-fusion weldable base alloys and other cast workpieces will also benefit herefrom.

Figure 4:
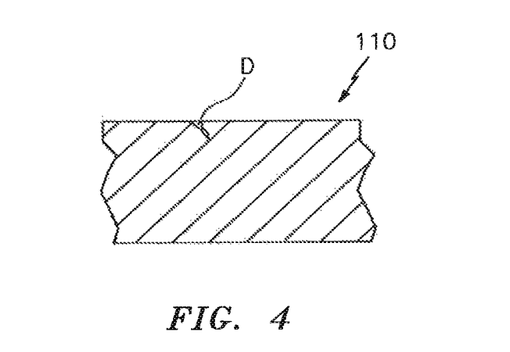
FIG. 4 is an expanded cross-sectional view of a casting defect in a cast component.

In some components, even under normal acceptable manufacture, the casting process may result in the formation of casting defects (illustrated schematically by area D; also shown in FIG. 4). Each casting defect is typically less than about 1 inch (25 mm) in size. It should be appreciated that various casting defect sizes and locations will benefit herefrom. Furthermore, various cast nickel based alloys may be reworked, repaired or remanufactured in accordance with the disclosed method.

Figure 5:
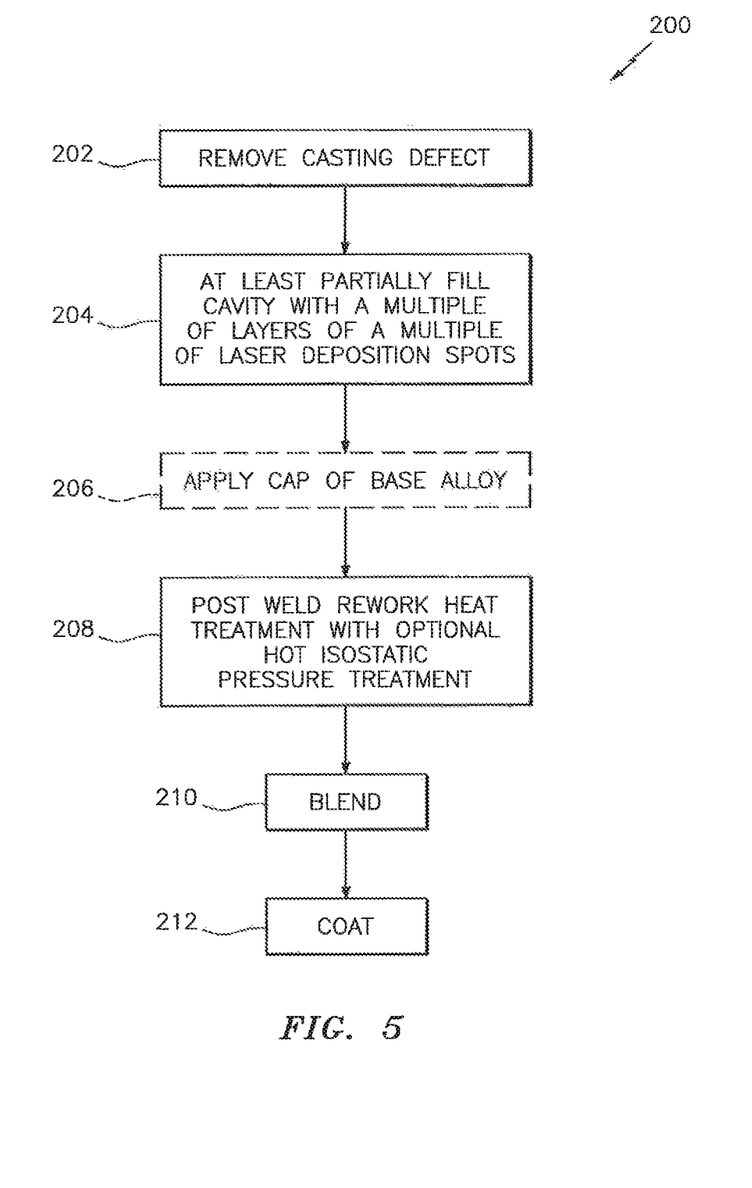
FIG. 5 is a flowchart illustrating a method to rework a cast component according to one disclosed non-limiting embodiment.
Figure 6:
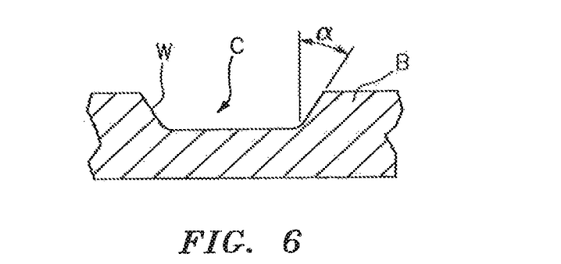
FIG. 6 is an expanded cross-sectional view of one step to rework a casting defect in the cast component.
Figure 7:
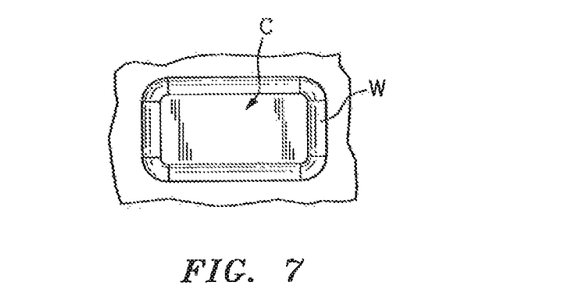
FIG. 7 is a top down view of a cavity formed to remove the casting defect.

With reference to FIG. 5, one disclosed non-limiting embodiment of a rework method 200 initially includes removal of the casting defect D (see FIG. 4) such as through machining, grinding or other operation (step 202; see FIGS. 6 and 7). Removal of the casting defect D forms a cavity C. Removal of the casting defect D may be performed to form a wall W around the periphery of the cavity C at a specific incline angle $\alpha$. In one example, the incline angle may be about 30 to 75 degrees. It should be appreciated that the cavity C may define a circular, rectilinear (see FIG. 8) or other periphery.

Figure 8:
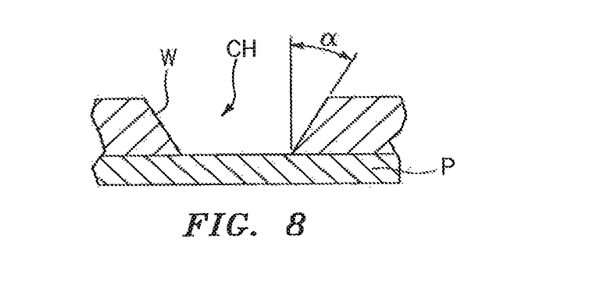
FIG. 8 is an expanded cross-sectional view of one step to rework a casting defect in the cast component according to another disclosed non-limiting embodiment.

In another disclosed non-limiting embodiment, removal of a casting defect may result in a through hole CH (see FIG. 8). Again, an incline angle of the wall W that surrounds the cavity C may define an incline angle within about 30 to 75 degrees. A backing P such as a metal plate closes the through hole CH (see FIG. 8). The thickness of the backing can be as thin as about 0.003 inches (0.08 mm) and temporarily mechanically attached to the workpiece such as by a clamp. The backing P is removed after the rework.

Figure 9:
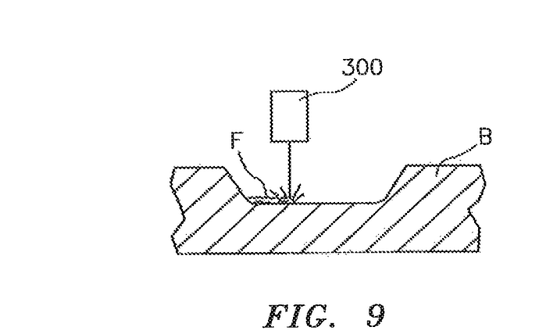
FIG. 9 is an expanded cross-sectional view illustrating one step of a filler alloy being formed in the cavity to rework a casting defect in the cast component.
Figure 10:
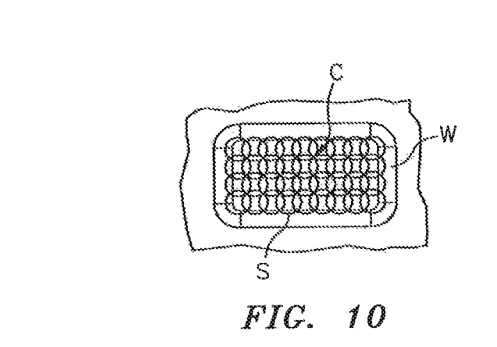
FIG. 10 is a top down view of a cavity illustrating one layer of a multiple of laser powder deposition spots of a filler alloy being formed in the cavity.

Next, a laser powder deposition system 300 (illustrated schematically in FIG. 9) is utilized to deposit a filler alloy F of an alloy powder as discrete laser powder deposition spots S in the cavity C (see FIG. 10). Laser powder deposition processes are methods with which metal powder is injected into the focused beam of a high-power laser under controlled atmospheric conditions. The focused laser beam melts the surface of the target material and generates a small molten pool of base material. Powder delivered into this same spot S is absorbed into the melt pool, thus generating a spot S that may, for example, range from about 0.005 to 0.040 inch (0.127 mm-1 mm) thick and 0.040 to 0.160 inch (1 mm-4.1 mm) wide. In one disclosed non-limiting embodiment the laser powder deposition system 300 is mounted to an automated end effector adapted to direct the focused laser beam and metal powder injection in a known orientation relative to the surface of the workpiece. It should be appreciated that the automated end effector, the workpiece, or both can be tilted or otherwise adjusted during the process to obtain a desired angle; however, even if the angle is changed during the process, an angle greater than about 15 degree may still be required for the laser energy to be effectively absorbed.

The cavity C is filled with a multiple of layers of a multiple of laser powder deposition spots S applied with the laser powder deposition system 300 generally at room temperature. In one example, each laser powder spot S overlays the adjacent laser powder deposition spots S by about 50%. That is, the multiple of laser powder deposition spots S in each layer form a matrix of overlapping laser powder deposition spots S. The outer most laser powder deposition spots S are located at least partially on the wall W. That is, the incline angle of the wall W permits each layer to at least partially overlap the wall W as well as permit the laser from the laser powder deposition system 300 direct access into the cavity C. It should be appreciated that the incline angle may be at least partially adjusted by adjusting the angle of incidence of the laser beam to the workpiece. In one disclosed non-limiting embodiment the laser powder deposition system 300 is mounted to an automated end effector adapted to direct the focused laser beam and metal powder injection in a known orientation relative to the surface of the workpiece. It should be appreciated that the automated end effector, the workpiece, or both can be tilted or otherwise adjusted during the process to obtain a desired angle, however, even if the angle is changed during the process, an angle greater than about 15 degree may still be required for the laser energy to be effectively absorbed.

Figure 11:
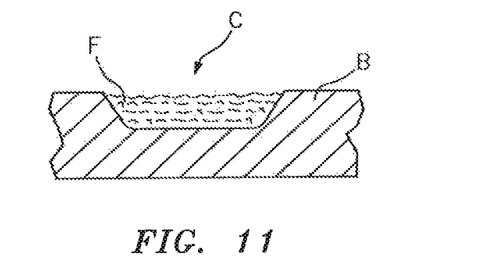
FIG. 11 is an expanded cross-sectional view of a filler alloy application step to rework a casting defect in the cast component.

Additional layers of laser powder deposition spots S are progressively applied to at least partially fill the cavity C (see FIG. 11). That is, although each spot S is generally equivalent, a greater number of laser powder deposition spots are typically applied in each layer so as to fill the cavity C. When each subsequent layer of the laser powder deposition spots S is applied, the laser to layer distance may also be adjusted to ensure that the laser to layer distance is maintained generally constant so that the laser power and powder quantity per spot S is generally maintained constant. The metal powder may be an alloy with a matched composition or under-matched composition to include, but not be limited to, Hastelloy X, PWA 795, MERL 72, Alloy 625 and others.

In one specific disclosed non-limiting embodiment, a cavity C in a MTF 82 workpiece manufactured of a non-fusion weldable base alloy B of MAR-M 247 polycrystalline cast nickel base superalloy is filled with a filler alloy F of PWA 795. That is, the non-fusion weldable base alloy of the workpiece is of one material while the filler alloy F is of a different material.

Figure 12:
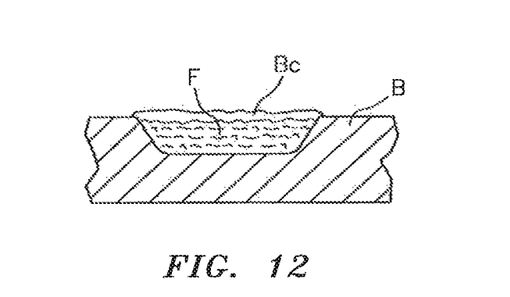
FIG. 12 is an expanded cross-sectional view of a non-fusion weldable base alloy cap one step to rework a casting defect in the cast component.

If an application requires the use of a matching alloy at the surface to meet a required material property, a layer of non-fusion weldable base alloy BC may optionally be applied at least partially within the cavity C and over the filler alloy F (step 206; see FIG. 12). That is, the non-fusion weldable base alloy B of the workpiece is utilized to cover or cap the cavity C that is primarily filled with the filler alloy F. In this example, the cap of non-fusion weldable base alloy BC is MAR-M 247 that is electro-spark deposited to completely fill the cavity C. In this example, the cap of non-fusion weldable base alloy BC may be about 0.010 inches (0.25 mm) thick. It should be appreciated that the cap of non-fusion weldable base alloy BC is not always necessary.

Electro-spark deposition may also be referred to as "spark hardening", "electrospark toughening" or "electrospark alloying. It should be appreciated that other techniques may be utilized as, since only a relatively thin cap of non-fusion weldable base alloy BC is applied, a relatively slow technique is still readily utilized. That is, a technique that may otherwise be too slow and expensive to fill the entire cavity C, is readily utilized to form the thin cap of non-fusion weldable base alloy B.

Once the cavity C is filled or at least partially filled with a multiple of layers of the multiple of laser powder deposition spots S and the optional cap of non-fusion weldable base alloy BC is applied, the filler alloy F may be post weld treated (step 208). Examples of post weld treatment include, but are not limited to, heat treatment, hot isostatic pressing, and/or others.

Figures 13, 14:
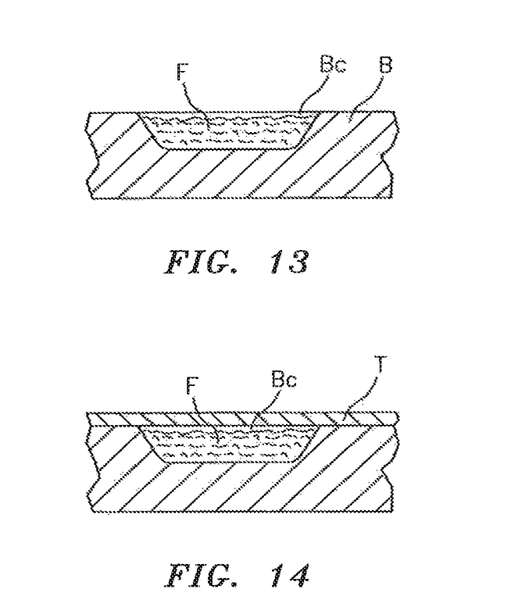
FIG. 13 is an expanded cross-sectional view of a blending step to rework a casting defect in the cast component.
FIG. 14 is an expanded cross-sectional view of a coating step to rework a casting defect in the cast component.

Next, the multiple of laser powder deposition spots S and/or cap of non-fusion weldable base alloy BC may be blended into the workpiece to form a desired profile (step 210; see FIG. 13). That is, the cap of non-fusion weldable base alloy BC results in contiguous surface of the common non-fusion weldable base alloy B over the cavity C.

Finally, as the cap of non-fusion weldable base alloy BC provides the contiguous surface, the workpiece may be readily coated with a coating T (see FIG. 14). That is, the cap of non-fusion weldable base alloy BC is fully compatible with an oxidation, thermal barrier or other coating T tailored to the non-fusion weldable base alloy BC such that full benefit thereof is received.

The method may reduce the typical repair time down from several hours to, for example, several minutes. This reduces the overall expense to cast components of high gamma prime nickel based alloy such as MAR-M 247 polycrystalline cast nickel base superalloy as well as the repair and remanufacture of other nickel alloy castings.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein; however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method, comprising:
    casting a component from a base alloy;
    removing a casting defect from the component manufactured of the base alloy to form a cavity that extends into the component from a surface of the component;
    at least partially filling the cavity with a plurality of layers of laser powder deposition spots, each of the laser powder deposition spots comprising a filler alloy, and a first of the laser powder deposition spots having a circular cross-sectional geometry when viewed in a plane parallel to a plane of the surface; and
    sealing a through hole with a backing prior to the at least partially filling of the cavity, wherein the removing of the casting defect forms the through hole.

2. The method of claim 1, further comprising applying a base alloy cap at least partially within the cavity and over the filler alloy.

3. The method of claim 2, further comprising applying a coating over the base alloy cap.

4. The method as recited in claim 2, further comprising electro-spark depositing the base alloy cap.

5. The method as recited in claim 4, wherein the base alloy cap is about 0.010 inches (0.25 mm) thick.

6. The method of claim 1, further comprising applying a coating over the filler alloy and the surface.

7. The method as recited in claim 1, wherein the filler alloy comprises a fusion weldable powder material.

8. The method as recited in claim 7, wherein the base alloy comprises a high gamma prime nickel based alloy.

9. The method as recited in claim 7, wherein the base alloy comprises a polycrystalline cast nickel base superalloy.

10. The method as recited in claim 1, further comprising casting the component to form a portion of a mid-turbine frame.

11. A method, comprising:
    removing a casting defect from a component manufactured of a base alloy to form a cavity in the component; and
    depositing a plurality of layers of laser powder deposition spots within the cavity, each of the laser powder deposition spots comprising a filler alloy, and the laser powder deposition spots comprising a first spot, a second spot, a third spot and a fourth spot;
    wherein the first spot contacts and partially overlaps the second spot and the third spot in a lateral direction;
    wherein the first spot contacts and partially overlaps the fourth spot in a transverse direction that is perpendicular to the lateral direction.

12. The method of claim 1, wherein
    the cavity extends into the component from a surface of the component; and
    one of the laser powder deposition spots has a circular cross-sectional geometry when viewed in a plane parallel to a plane of the surface.

13. The method of claim 11, further comprising applying a base alloy cap at least partially within the cavity and over the filler alloy.

14. The method of claim 13, further comprising applying a coating over the alloy cap.

15. A method, comprising:
    removing a casting defect from a component manufactured of a base alloy to form a cavity that extends into the component from a surface of the component; and
    depositing a plurality of layers of laser powder deposition spots within the cavity, each of the laser powder deposition spots comprising a filler alloy, and each of the laser powder deposition spots in a first of the plurality of layers at least partially overlapping another one of the laser powder deposition spots in the first of the plurality of layers;
    wherein a width of a first of the laser powder deposition spots along a first axis is equal to a width of the first of the laser powder deposition spots along a second axis that is perpendicular to the first axis; and
    wherein the first axis and the second axis define a plane that is parallel to a plane of the surface.

16. The method of claim 15, wherein one of the laser powder deposition spots has a circular cross-sectional geometry when viewed in the plane.

17. The method of claim 15, further comprising:
applying a base alloy cap at least partially within the cavity and over the filler alloy; and
applying a coating over the base alloy cap.

* * * * *